(12) United States Patent
Kai et al.

(10) Patent No.: US 7,737,619 B2
(45) Date of Patent: Jun. 15, 2010

(54) DISPLAY DEVICE, VENT TUBE WITH GLASS RING, PHOSPHATE GLASS RING, AND METHOD OF PRODUCING THE SAME

(75) Inventors: Yoshiaki Kai, Osaka (JP); Shinya Hasegawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/495,257

(22) Filed: Jun. 30, 2009

(65) Prior Publication Data
US 2009/0260845 A1    Oct. 22, 2009

Related U.S. Application Data

(63) Continuation of application No. 12/092,768, filed as application No. PCT/JP2006/322473 on Nov. 10, 2006.

(30) Foreign Application Priority Data

| Nov. 11, 2005 | (JP) | ............................. 2005-327505 |
| Nov. 11, 2005 | (JP) | ............................. 2005-327506 |
| Nov. 11, 2005 | (JP) | ............................. 2005-327507 |

(51) Int. Cl.
*H01J 63/04* (2006.01)
(52) U.S. Cl. ....................... 313/495; 313/582
(58) Field of Classification Search ......... 313/495–497, 313/582–587
See application file for complete search history.

(56) References Cited

U.S. PATENT DOCUMENTS 5,751,107 A * 5/1998 Komatsu .................... 313/496
2003/0227252 A1    12/2003 Ikeya et al.

FOREIGN PATENT DOCUMENTS

| JP | 5-319835 A | 12/1993 |
| JP | 11-246236 A | 9/1999 |
| JP | 2000-007375 A | 1/2000 |
| JP | 2003-238199 A | 8/2003 |
| JP | 2003-335557 A | 11/2003 |
| JP | 2004-014332 A | 1/2004 |
| JP | 2004-182584 A | 7/2004 |
| JP | 2004-182585 A | 7/2004 |
| JP | 2005-019186 A | 1/2005 |
| JP | 2005-281125 A | 10/2005 |

* cited by examiner

*Primary Examiner*—Toan Ton
*Assistant Examiner*—Hana A Sanei
(74) *Attorney, Agent, or Firm*—Hamre, Schumann, Mueller & Larson, P.C.

(57) ABSTRACT

The present invention reduces the amount of lead used in a display device and improves its long-term moisture resistance. This display device includes: a panel (1*b*) provided with a hole (11) formed therein; a phosphate glass member (13); and a tube (12) mounted on the panel (1*b*) via the glass member (13) so as to cover the hole (11). The glass member (13) is bonded to at least a partial area of the inner wall surface of the tube (12) and to a partial area of the panel (1*b*), so that the entire periphery of the end face of the tube (12) located on the side of the hole (13) is in contact with the panel (1*b*).

18 Claims, 8 Drawing Sheets

DISPLAY DEVICE, VENT TUBE WITH GLASS RING, PHOSPHATE GLASS RING, AND METHOD OF PRODUCING THE SAME

This application is a continuation of U.S. application Ser. No. 12/092,768, filed May 6, 2008, which is a U.S. National Stage of PCT/JP2006/322473, filed Nov. 10, 2006, which application is incorporated herein by reference.

TECHNICAL FIELD

The present invention relates to a display device such as a plasma display panel and a field emission display, and more particularly to a display device having excellent gas-tightness for a luminescence excitation space. The present invention also relates to a vent tube with a glass ring and a phosphate glass ring that are suitable for producing such a display device.

BACKGROUND ART

Display devices, such as a plasma display panel (hereinafter referred to as a "PDP") and a field emission display (hereinafter referred to as an "FED"), have been gaining attention as flat panel display devices that can achieve both an increase in screen size and reductions in thickness and weight.

These display devices each are provided with a pair of panels between which a luminescence excitation space is formed. This luminescence excitation space is a space corresponding to, for example, a discharge space in a PDP, filled with a discharge gas containing an inert gas as its main component, or a vacuum space in an FED, from which electron beam energy emitted from an electron source can be obtained without attenuating the energy, and this space is required to have a high gas-tightness.

The atmosphere in a luminescence excitation space needs to be adjusted when a display device is produced. The atmosphere is adjusted via a tube (a vent tube) mounted on a panel so as to be communicated with a hole (a vent hole) formed in the panel. As such a vent tube, a tube having a stable tip shape, for example, a tube having an enlarged diameter portion 53 and a flange portion 52, as shown as a tube 12 in FIG. 7A, commonly is used to improve its stability in bonding to the panel. The tube is mounted on the panel using a glass ring having a stepped portion, as a saucer for the opening portion at the tip of the tube to be fitted into the ring, formed on the surface of the inner peripheral wall thereof, as shown as a ring 22 in FIG. 7A. After the vent hole, the vent tube and a through-hole of the glass ring are aligned with one another, the glass ring is melted to form a glass member, so that the tube 12 is mounted on the panel 1b via the glass member 23 so as to cover the hole 11 formed in the panel 1b, as shown in FIG. 7B.

It is not easy to form a glass ring of a complex shape as shown in FIG. 7A without causing a defect such as a crack, a chip, and deterioration of glass, and therefore a glass material that can be used for such a glass ring is limited only to a lead oxide glass.

From the viewpoint of natural environmental protection, there is a need to replace a conventional lead glass with a lead-free glass, as a glass material. As a candidate for such a glass material, for example, JP2003-238199A and JP2004-182584A have proposed a glass material containing phosphorus oxide ($P_2O_5$) (phosphate glass material).

It is very difficult, however, to form, using a phosphate glass material, a glass ring not only having a complex shape corresponding to the stable tip shape of a vent tube but also having few defects such as a crack and deterioration.

DISCLOSURE OF INVENTION

When a phosphate glass material is used, the water resistance of a glass ring is reduced drastically in comparison with a lead glass material due to a high deliquescence of phosphorus oxide ($P_2O_5$). A high deliquescence of phosphorus oxide is attributable to the fact that each phosphorus atom of phosphorus oxide coordinates to four oxygen atoms although it has five valence electrons, and thus phosphorus oxide includes a group of three unstable branch points, each having a shared oxygen atom. This group of branch points is likely to absorb the moisture in the atmosphere threinto to stabilize themselves. It is difficult to enhance the water resistance of a glass ring made of a phosphate glass material up to a level of a glass ring made of lead glass.

Therefore, even if a glass ring with a stepped portion formed therein, as shown in FIG. 7A, can be formed without any defect by using a phosphate glass material, it is not easy to extend the life of a display device produced using this glass ring. Since a glass member formed from a glass ring is exposed to the outside air, as shown in FIG. 7B, it is difficult to completely prevent the exposed portion from coming in contact with the moisture in the outside air. Therefore, the body of the glass member is eroded by moisture when it is made of a phosphate glass material, thereby causing a reduction in gas-tightness of a luminescence excitation space.

A factor that moisture erosion of a phosphate glass member spreads not only to the exposed portion but also to the body of the glass member is the fact that the end face of the vent tube is not brought close to the panel to such an extent that the moisture in the outside air is blocked from entering the tube. According to the study of the present inventors, even if the load to be applied to both the panel and the vent tube for mounting the vent tube on the panel is increased close to the limit up to which a damage of the panel and the vent tube can be avoided, it is not easy to press down the stepped portion of the ring disposed between the end face of the vent tube and the panel so as to bring the end face of the vent tube close to the panel to the above-described extent.

It is an object of the present invention to improve a long-term moisture resistance of a display device even though a phosphate glass is used as a material of a glass ring (glass member) to be used for mounting a vent tube on a panel. It is another object of the present invention to provide a vent tube with a glass ring, a phosphate glass ring, and a method of producing them, which are suitable for producing this display device.

The present invention provides a display device including: a panel having a hole formed therein; a phosphate glass member; and a tube mounted on the panel via the phosphate glass member so as to cover the hole. In this display device, the phosphate glass member is bonded to at least a partial area of the inner wall surface of the tube and to a partial area of the panel, and the entire periphery of an end face of the tube located on the side of the hole is in contact with the panel.

Another aspect of the present invention provides a vent tube with a glass ring for producing the above-described display device, including: a vent tube; and a phosphate glass ring bonded to at least a partial area of the inner wall surface of the vent tube.

Still another aspect of the present invention provides a phosphate glass ring for producing the above-described display device. This phosphate glass ring has, as a shape to be contacted with at least a partial area of the inner wall surface of a tube to be mounted on a panel, a face corresponding to the outer peripheral surface of a predetermined solid of revolution, and has, as a shape to be contacted with a partial area of the panel, an end face with a through-hole formed therein. The outer peripheral surface is inclined at an angle of a range between more than 0 degree and less than 90 degrees with respect to a plane perpendicular to the revolution axis of the solid of revolution, and the phosphate glass ring essentially does not contain a binder.

Yet still another aspect of the present invention provides a method of producing the above-described phosphate glass ring, including the steps of: shaping a frit-binder mixture containing a phosphate glass frit and a binder that is solid in the atmosphere of 25° C. and has a boiling point of 400° C. or lower, so as to obtain a shaped ring having a face corresponding to the outer peripheral surface of a predetermined solid of revolution as well as an end face with a through-hole formed therein; and heating the shaped ring so as to remove the binder.

Note that "a binder 'essentially' is not contained" in this description means that the content of a known organic compound used as a glass binder is in the range of less than 1 ppm, more specifically, less than 1 ppb. The unit "ppm" denotes parts per million by mass, whereas "ppb" denotes parts per billion by mass. The organic compound content may be evaluated using a known technique such as gas chromatography mass spectrometry (GC-MS).

According to the present invention, it is possible to prevent a glass member from coming in contact with the moisture in the outside air even though a phosphate glass is used as a material of a glass ring (the glass member) involved in mounting a tube on a panel, and thus to improve a long-term moisture resistance of a display device.

BEST MODE FOR CARRYING OUT THE INVENTION

Figure 1:
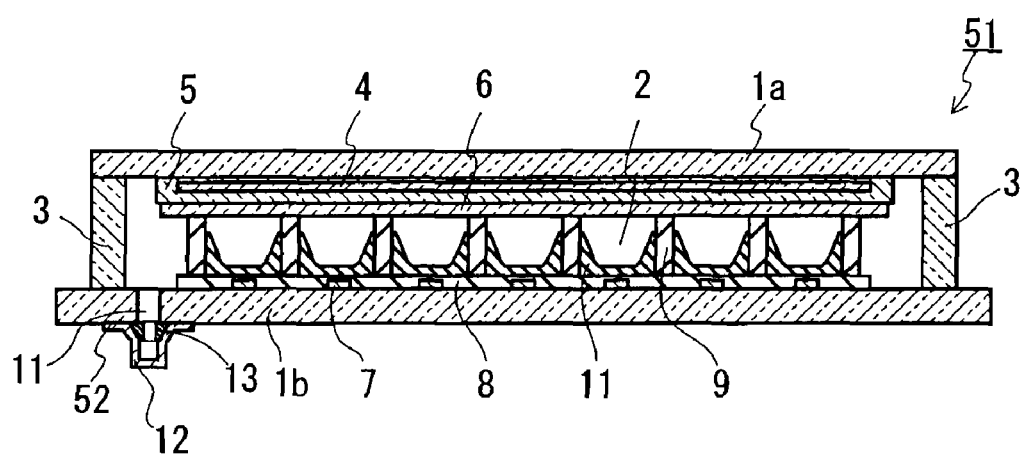
FIG. 1 is a cross-sectional view of an example of a display device according to the present invention.

An embodiment of the present invention is described below.

[1. Tube]

In producing a display device, a luminescence excitation space thereof is gas-tightened by adjusting the atmosphere in the space via a vent tube mounted on a panel so as to cover a vent hole formed in the panel and then sealing the end portion of the vent tube located on the opposite side to the panel. In the present description, not only a tube with both ends opened but also a tube with one end closed are treated as tubes.

It is preferable that a tube have a shape that allows an increase in bonding stability between the tube and a panel, that is, a shape that makes it easier to distribute the stress to be applied to an area of contact between the tube and the panel. Examples of structures of a tube having such a shape include: a tube having a tubular portion and a flange portion connected to the tubular portion, in which the flange portion serves as the hole-side end face of the tube; a tube having a narrow portion and an enlarged diameter portion having a larger diameter than that of the narrow portion and located closer to the panel than the narrow portion is; a tube not essentially having a narrow portion but having an enlarged diameter portion with its diameter increasing toward the panel; and so on. The diameter of the tip of the tube can be increased by forming the enlarged diameter portion or the flange portion at the tip of the tube, thereby increasing the bonding stability to stand the tube vertically to the panel.

Examples of such shapes of the enlarged diameter portion include: (1) a shape having uniform inside/outside diameters in its longitudinal direction (for example, a cylindrical shape as shown as a tube 16 in FIG. 5A); and (2) a shape having first inside/outside diameters and second inside/outside diameters that are different from the first inside/outside diameters: more specifically, (2A) a shape having the second inside/outside diameters increasing toward the end face thereof and their increase rate being fixed (for example, a flared shape as shown as a tube 12 in FIG. 4A); (2B) a shape having the second inside/outside diameters with their increase rate decreasing toward the end face thereof (for example, a bell shape as shown as a tube 19 in FIG. 6A); (2C) a shape having the second inside/outside diameters increasing toward the end face thereof in a stepped manner; (2D) a shape having the second inside/outside diameters decreasing once and increasing again toward the end face thereof, and so on.

It should be noted that in order to simplify the description, the tubes having enlarged diameter portions of shapes corresponding to the above-mentioned shapes (1), (2A) and (2B) are referred to as a tube with a cylindrical portion, a tube with a flared portion, and a tube with a bell-shaped portion, respectively.

It is preferable to use glass as a material of the tube in terms of smooth mounting on the panel, although the material is not particularly limited.

In the display device, the tube is placed in such a manner that the entire periphery of its hole-side end face comes in contact with the panel and thus covers the hole formed in the panel. That the entire periphery comes in contact with the panel, as described above, means that the above-mentioned end face and the panel are brought closer to each other to such an extent that the phosphate glass member placed in the tube is kept from being exposed to the moisture in the outside air so as to prevent deterioration of the glass member caused by the moisture in the outside air. This is not intended to exclude a state in which there is a gap of less than 5 μm between the above-mentioned end face and the panel, as shown in Examples to be described later.

[2. Phosphate Glass Member]

In the display device, the phosphate glass member is bonded to at least a partial area of the inner wall surface of the tube and to a partial area of the panel, as described above. Since the entire periphery of the end face of the tube is in contact with the panel, as described above, the phosphate glass member is not exposed to the outside air. That the phosphate glass member is not exposed to the outside air is not intended to exclude a state in which the phosphate glass member in the tube is exposed to the outside air through a gap of less than 5 μm between the end face of the tube and the panel, which is permitted to exist therebetween.

It is preferable that the entire periphery of the outer wall surface of the phosphate glass member, or more preferably the entire outer wall surface thereof be bonded to the inner wall surface of the tube, in view of a firm mounting of the tube on the panel. In the case where the tube has an enlarged diameter portion, it is preferable that the phosphate glass member be bonded to at least a partial area of the inner wall surface of the enlarged diameter portion, for the same reason.

When the phosphate glass member has a shape having a face corresponding to the outer peripheral surface of a predetermined solid of revolution, it becomes easier to realize the above-described bonding state. Examples of the outer peripheral surface of a predetermined solid of revolution include a shape of a surface with its inclination angle with respect to a plane perpendicular to the revolution axis of the solid of revolution being in the range between more than 0 degree and less than 90 degrees. It is preferable that the solid of revolution have an outer shape such as a cylindrical shape, a conical trapezoidal shape, and a bell shape, respectively, for a tube with a cylindrical portion, a tube with a flared portion, and a tube with a bell-shaped portion.

As described above, the phosphate glass member in the display device may have a shape corresponding to the outer peripheral surface of a predetermined solid of revolution, the inclination angle of the outer peripheral surface with respect to a plane perpendicular to the revolution axis of the solid of revolution may be in the range between more than 0 degree and less than 90 degrees, and the outer peripheral surface may be bonded to at least a partial area of the inner wall surface of the tube. The phosphate glass material may have a shape of a solid of revolution such as a cylindrical shape, a conical trapezoidal shape or a bell shape.

As another factor for firm mounting of the tube on the panel, it is preferable that the area of the phosphate glass member to be bonded to the panel be as large as possible.

A vent tube housing a phosphate glass ring therein is placed on the panel, and then the phosphate glass ring is heated to be melted, as described later. Thus a phosphate glass member is formed.

A phosphate glass ring is formed in the following manner: a frit-binder mixture including: a phosphate glass frit containing phosphorus oxide ($P_2O_5$) as a main component for forming a network structure of glass (a main component of a glass network former), such as $P_2O_5$—SnO, $P_2O_5$—SnO—ZnO, $P_2O_5$—SnO—$SiO_2$, $P_2O_5$—SnO—$Al_2O_3$, or $P_2O_5$—SnO—$B_2O_3$; and a sublimable binder that is solid in the atmosphere of normal temperature and pressure (25° C. and 101325 Pa) and has a boiling point of 400° C. or lower, is shaped to obtain a ring as a shaped body. Then, the obtained ring is heated at a calcination temperature that is a glass transition point of the phosphate glass frit or higher and lower than its softening point, more specifically, at 250 to 450° C., to remove the binder and sinter the shaped ring. Thus, the phosphate glass ring is formed.

As a result, a phosphate glass ring contains no lead and essentially does not contain a binder. When a glass ring in which residual binder remains is used, glass may deteriorate or crack when heating is carried out for mounting a vent tube on a panel, so that the tube cannot be mounted firmly on the panel, as hereinafter will be described in detail.

Figure 4A:
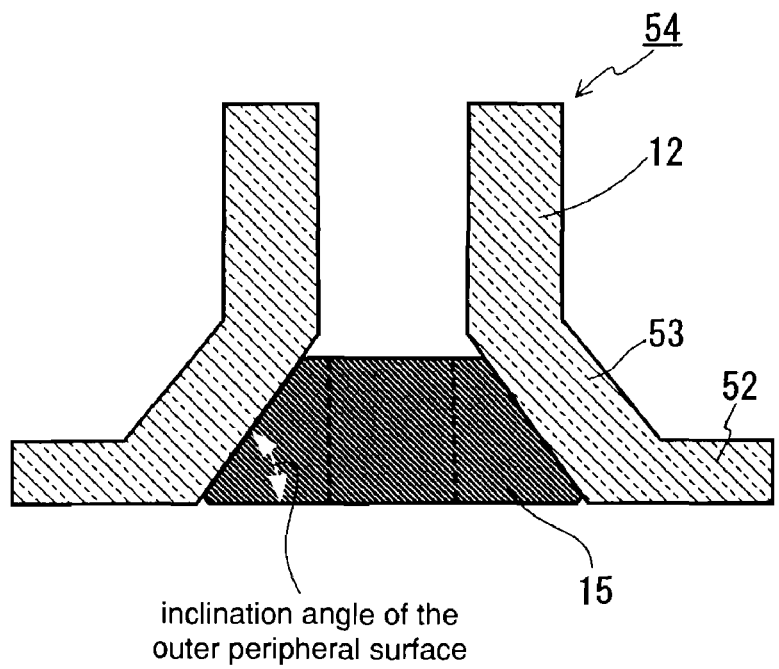
FIG. 4A is a cross-sectional view of an example of a phosphate glass ring and a vent tube containing the glass ring therein, which are used for producing the display device according to the present invention.

It is desirable, in terms of enhancing bonding strength between the inner wall surface of a vent tube and a phosphate glass ring, that the phosphate glass ring be formed to have a shape that allows at least a partial area of the outer wall surface thereof, even the entire periphery of the outer wall surface thereof, or particularly the entire outer wall surface thereof to come in contact with the inner wall surface of the vent tube. Examples of such a shape include a shape having a face corresponding to the outer peripheral surface of a predetermined solid of revolution as well as an end face with a through-hole formed therein. Examples of an outer peripheral surface of a predetermined solid of revolution include a shape of a face with its inclination angle with respect to a plane perpendicular to the revolution axis of the solid of revolution being in the range between more than 0 degree and less than 90 degrees, as shown in FIG. 4A. It is preferable that the solid of revolution has an outer shape such as a cylindrical shape, a conical trapezoidal shape, and a bell shape, respectively, when the vent tube is a tube with a cylindrical portion, a tube with a flared portion, and a tube with a bell-shaped portion.

The above-mentioned phosphate glass frit may contain 20 mol % or more of phosphorus oxide ($P_2O_5$) in terms of oxide thereof, but it is preferable that the upper limit of the content of $P_2O_5$ be 50 mol %, in terms of preventing a reduction in water resistance of a ring.

The phosphate glass frit further may contain tin oxide (SnO). A phosphate glass frit containing 15 mol % or more of SnO in terms of oxide thereof allows a ring to have an improved water resistance while maintaining a softening point of glass at a low level. In terms of maintaining stability of glass at a high level, it is preferable that the upper limit of the SnO content be 60 mol %.

Examples of the above-mentioned sublimable binder (an organic compound) include one selected from the group consisting of camphor (its boiling point is 204° C.), naphthalene (its boiling point is 218° C.), and anthracene (its boiling point is 354° C.). A sublimable organic compound completely disappears and does not remain in a glass ring at a calcination temperature that is a glass transition point of a phosphate glass frit or higher and lower than its softening point, more specifically, at 250 to 450° C. Since a sublimable organic compound is hydrophobic (does not have a hydrophilic group intramolecularly) and has a strong bonding force, it is effective as a binder that makes it possible to form a glass ring from various low-melting point glass frits.

The above-mentioned binder typified by camphor makes it easier to form a glass ring in which no residual binder remains, as described above, because it can be completely removed by calcination (binder removing process) due to its sublimation property. Using the above-mentioned binder typified by camphor to form a glass ring is effective particularly for forming a glass ring having a complex shape of its outer wall surface using phosphorus oxide ($P_2O_5$) and tin oxide (SnO) as glass materials. Particularly, glass containing SnO has a relatively low strength and is vulnerable to the adverse effects of residual binder, which cause a serious problem. In addition, the more complex the shape of a ring becomes, the more difficult it is to keep the balance of stress, and thereby defects are likely to occur due to glass deterioration and residual binder.

When a binder remains in a glass ring, glass may deteriorate or crack at the time of mounting a tube on a panel, so that the tube cannot be mounted firmly on the panel in some cases. Glass containing phosphorus oxide is likely to deteriorate due to its low water resistance, whereas the above-mentioned binder typified by camphor rapidly volatilizes due to its so-called sublimation property in any of the processes involving formation of a ring except a binder removing process and generates an aerial current in the direction away from a shaped ring. This blocks moisture from coming closer to the shaped ring, protects a phosphate glass with a low water resistance from moisture during formation of a glass ring, and thus prevents deterioration of the glass. Accordingly, it becomes easier to form a phosphate glass ring having an outer wall surface of a complex shape with fewer defects such as a crack and a chip.

When a non-sublimable binder, for example, a polymer binder such as polyethylene carbonate, a polyethylene glycol derivative and polymethylstyrene disclosed in JP2004-182584A, is used to form a glass ring, it is difficult to remove the binder completely although its polymer structure can be decomposed to a certain extent through heating in a binder removing process, which results in a specific amount of or more residual binder remaining in the glass ring. A defect may occur in a glass ring due to residues remained after decomposition. When a non-sublimable binder that does not volatilize so rapidly as the above-mentioned sublimable binder is used, it is difficult to block moisture from coming close to a glass material during formation of a ring, which may result in deterioration of phosphate glass.

It is preferable that the sublimable organic compound content relative to a phosphate glass frit be in the range between 1 mass % and 20 mass %, more preferably, in the range between 5 mass % and 15 mass %. The content of 1 mass % or more allows a phosphate glass frit to be bonded more firmly. In addition, the content of 20 mass % or less more reliably allows it to realize a state in which there is no sublimable organic compound remaining in a ring after being calcined. As described above, it is preferable that the binder content relative to a phosphate glass frit be in the range between 1 mass % and 20 mass %, inclusive, in a frit-binder mixture.

The above-mentioned frit-binder mixture may be prepared by adding 50 to 150 parts by mass of an organic solvent into 100 parts by mass of a phosphate glass frit containing a sublimable organic compound in the range between 1 mass % and 20 mass % thereto, sufficiently stirring the resulting substance, and then evaporating the organic solvent at 30° C. or lower to dry it. It is preferable that evaporation to dryness be carried out at a temperature as low as possible and as quickly as possible in order not to reduce the sublimable organic compound content in the frit-binder mixture. Therefore, it is preferable to use an organic solvent with a boiling point of 100° C. or lower, more preferably, with a boiling point of 85° C. or lower, and more specifically, ethanol, isopropanol, diethyl ether, isopropyl ether, acetone, methyl ethyl ketone, acetic ether, methylene chloride, chloroform, 1,2-dichloroethane, or the like.

A phosphate glass frit further may contain ZnO, $SiO_2$, $Al_2O_3$, $B_2O_3$, or the like. These components facilitate glass production, and exert effects such as improvement in stability of glass, control of heat characteristics of glass, and improvement in water resistance of glass. An excessively large content of these components tends to cause an increase in softening point, a decrease in flowability, crystallization of glass, and the like, and therefore it is preferable that the content of the components mentioned above, from ZnO to $B_2O_3$, be 0.5 to 10 mol % of ZnO, 1 to 10 mol % of $SiO_2$, 1 to 10 mol % of $Al_2O_3$, and 0.5 to 5 mol % of $B_2O_3$, respectively.

The glass frit further may contain a substance such as $Li_2O$, $Na_2O$, $K_2O$, MgO, CaO, SrO, BaO, $V_2O_5$, $TeO_2$, CuO, $Bi_2O_3$, $TiO_2$, $MnO_2$, $ZrO_2$, $Nb_2O_5$, $MoO_3$, $WO_3$, and rare earth oxide. When these components are added, it becomes easier to control the heat characteristics of the glass composition or improve its strength.

The phosphate glass frit further may contain a refractory lead-free filler. Examples of a refractory lead-free filler include at least one selected from the group consisting of cordierite, willemite, forsterite, anorthite, zircon, mullite, beta-eucryptite, beta-spodumene, cristobalite, barium titanate, aluminum titanate, titanium oxide, tin oxide, aluminum oxide, zirconium oxide, zirconium phosphate, silica glass, sialon, silicon nitride, silicon carbide, a beta-quartz solid solution, and a compound that is expressed by a formula of $AD_2(MO_4)_3$. In the aforementioned formula, A denotes at least one element selected from the group consisting of Li, Na, K, Mg, Ca, Sr, Ba, Zn, Cu, Ni, and Mn, D denotes at least one element selected from the group consisting of Zr, Ti, Sn, Nb, Al, Sc, and Y, and M denotes at least one element selected from the group consisting of P, Si, W, and Mo.

It is preferable that the amount of the refractory lead-free filler to be contained in the glass frit be, for example, in the range of 0 mass % to 70 mass %, and preferably in the range of 5 mass % to 50 mass %. In the case of producing a display device, it is preferable that the difference in thermal expansion coefficient between the panel and the glass ring be as small as possible. Since a refractory filler has an effect of controlling the thermal expansion coefficient of glass, the difference in thermal expansion coefficient between the glass ring and the panel can be reduced by selecting the type and amount of the refractory filler to be contained in the glass ring.

As described above, the phosphate glass ring is obtained using the above-mentioned frit-binder mixture, and the phosphate glass member is obtained by heating the phosphate glass ring to melt it down. Therefore, the phosphate glass ring and the phosphate glass member essentially do not contain lead nor an organic binder. The phosphate glass ring and the phosphate glass member can contain 20 mol % or more of phosphorus oxide in terms of oxide thereof. The phosphate glass ring and the phosphate glass member further can contain tin oxide.

[Display Device]

As an example of a display device, a PDP and an FED can be given. One example of a display device of the present invention is described in more detail below, taking a PDP as an example.

[3-1. Configuration of PDP]

Figure 4B:
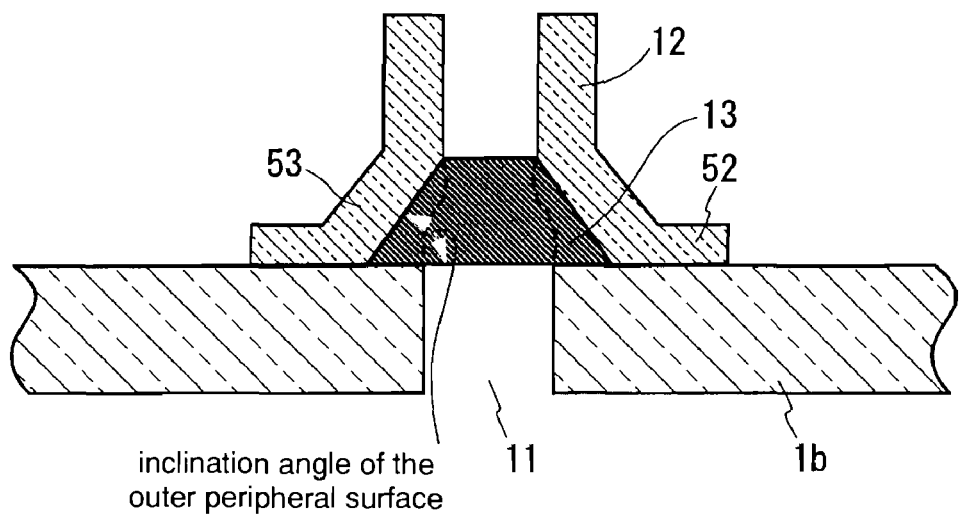
FIG. 4B is a view for illustrating an example of a state in which the tube is mounted on a panel via a phosphate glass member in the display device according to the present invention.

FIG. 1 is a cross-sectional view showing an example of the configuration of a PDP. In a PDP 51, a front panel including a substrate 1a (front substrate) and a back panel including a substrate 1b (back substrate) are disposed opposing each other so that a discharge space 2 (luminescence excitation space) is formed therebetween. The materials for the substrates 1a and 1b are not particularly limited, but glass commonly is used. As shown in FIG. 4B, the substrate 1b is provided with a hole 11, and a tube 12 is disposed on the principal plane located on the opposite side to the discharge space 2 of the substrate 1b so as to cover the hole 11.

The entire periphery of the hole-side end face of the tube 12 is in contact with the back panel. More specifically, the entire periphery of a flange portion 52 connected to the tubular portion of the tube 12 is in contact with the substrate 1b. A phosphate glass member 13 is bonded to the inside of the tube 12 (in the tube). The phosphate glass member 13 is not exposed to the outside air.

In the PDP 51, the peripheries of the substrates 1a and 1b are sealed together with a peripheral sealing wall 3. In addition, the end (narrow portion) of the tube 12 on the opposite side to the hole 11 is sealed.

An electrode group 4 including sustaining electrodes and scanning electrodes, a dielectric layer 5, and a protective layer 6 are disposed on the substrate 1a, while data electrodes 7, a dielectric layer 8, and barrier ribs 9 are disposed on the substrate 1b. The PDP 51 has a so-called "three-electrode structure". In FIG. 1, some of the barrier ribs and data electrodes to be included in an actual PDP are not shown.

Figure 2:
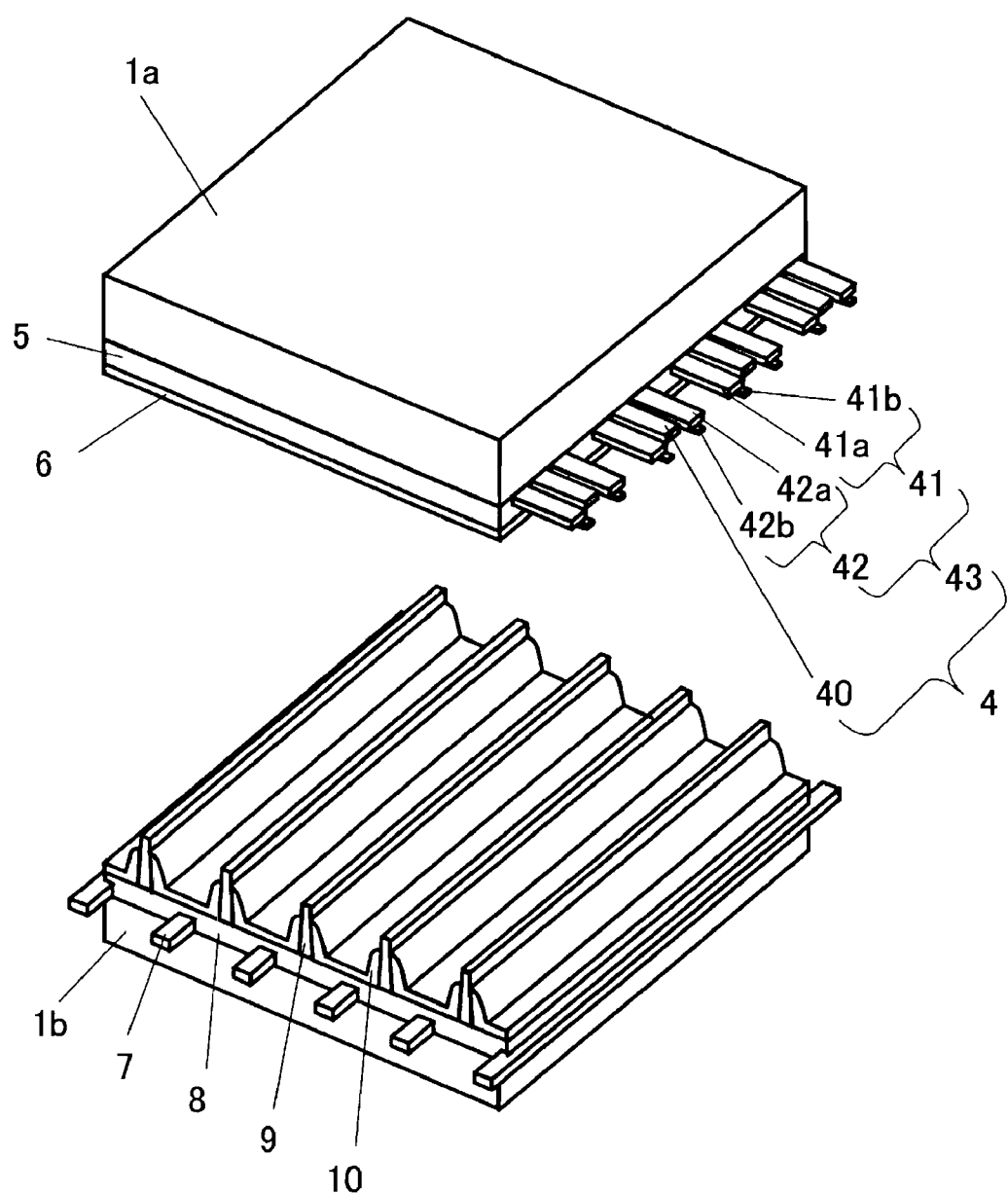
FIG. 2 is an exploded perspective view of the example of the display device according to the present invention.

FIG. 2 is a perspective view of the PDP 51, with the substrate 1a and the substrate 1b being separated. In FIG. 2, the peripheral sealing wall 3 and the glass member 13 are not shown, and the substrates 1a and 1b are shown only partly.

As shown in FIG. 2, stripe-like scanning electrodes 41 and sustaining electrodes 42 are disposed in parallel to one another as an electrode group 4 on the substrate 1a. A display electrode 43 is formed of a scanning electrode 41 and a sustaining electrode 42. The scanning electrode 41 has a structure formed of a transparent electrode (scanning electrode) 41a and a bus electrode (scanning electrode) 41b that are stacked together while the sustaining electrode 42 has a structure formed of a transparent electrode (sustaining electrode) 42a and a bus electrode (sustaining electrode) 42b that are stacked together. Examples of materials for the transparent electrodes 41a and 42a include ITO (indium tin oxide) and tin oxide. Examples of materials for the bus electrodes 41b and 42b include aluminum, copper, and silver. A black film 40 called a "black stripe" is disposed between the scanning electrode 41 and the sustaining electrode 42. The black film 40 is formed of glass and black pigments and is used for improving the quality of black display and increasing the contrast of images. The respective electrodes and black films 40 included in the electrode group 4 can be formed on the substrate 1a by a technique such as screen printing, for example.

Furthermore, the dielectric layer 5 is disposed so as to cover the display electrodes 43, on the substrate 1a. The protective layer 6 for protecting the dielectric layer 5 is disposed on the dielectric layer 5, more specifically on the discharge space 2 side of the dielectric layer 5. The dielectric layer 5 serves as a capacitor that accumulates electric charges when the PDP 51 displays an image. Examples of materials for the dielectric layer 5 and the protective layer 6 include a low-melting glass and MgO, respectively.

The dielectric layer 8, the barrier ribs 9, and the stripe-like data electrodes 7 are disposed on the substrate 1b. The dielectric layer 8 is disposed so as to cover the address electrodes 7. The barrier ribs 9 are arranged so as to be in parallel to one another. A phosphor layer 10 is disposed between adjacent barrier ribs 9. The discharge space 2 is divided into pixels by the barrier ribs 9. The phosphor layer 10 contains phosphors that emit red, green, or blue light. The materials for the address electrodes 7 and the dielectric layer 8 can be the same as those for the bus electrodes and the dielectric layer 5. Examples of materials for the barrier ribs 9 include glass and pigments.

The substrates 1a and 1b are disposed opposing each other so that the protective layer 6 and the barrier ribs 9 face the discharge space 2, and so that the stripe-like electrode group 4 and the address electrodes 7 are orthogonal to each other while being viewed from the principal planes of the substrates 1a and 1b. The discharge space 2 is filled with a discharge gas containing rare gas such as neon and xenon. The pressure of the discharge gas contained in the discharge space 2 can be, for example, in the range of 53329 Pa to 79993 Pa (400 Torr to 600 Torr).

In the PDP 51, an image signal voltage is applied selectively to the display electrodes 43 to cause a discharge gas to generate plasma discharge and to excite the phosphors contained in the phosphor layer 10 by ultraviolet rays emitted, and thereby the phosphors thus excited emit red, green, or blue light. Thus, a color image is displayed.

In the PDP 51, the glass member involved in mounting of the tube on the panel is not exposed to the outside air, as described above. Thereby, the above-mentioned glass member is blocked from contacting the moisture in the outside air and thus protected from erosion, and the occurrence of a slow leak in the bonding area between the panel and the tube is inhibited. Therefore, excellent image display performance is provided, and the satisfactory gas pressure in the discharge space is maintained for a long time and thus the normal discharge also is maintained.

[3-2. Production Method of PDP]

The PDP 51 can be produced in the following manner, for example.

(Production of Front Panel)

The display electrodes are formed in the following manner on the principal plane of the front substrate 1a made of soda-lime glass with a thickness of about 2.6 mm. It should be noted that although an example of forming display electrodes by a printing technique is shown here, they can be formed by another technique such as dye coating and blade coating.

First, a material of transparent electrodes (ITO) is applied in a predetermined pattern onto the surface of the substrate and then is dried. In parallel with this, a photosensitive paste that is a mixture of metal (Ag) powder, an organic vehicle and a photosensitive resin (photodegradable resin) is prepared. Next, this photosensitive paste is applied over the ITO pattern, which then is covered with a mask having a pattern of display electrodes to be formed. Thereafter, the photosensitive paste is exposed through the mask and developed and baked (at a temperature of around 590° C. to 600° C.). Thus, the bus electrodes 41b and 42b are formed on the transparent electrodes 41a and 42a. As a metallic material for the bus electrodes, a substance such as Pt, Au, Cu, Al, Ni, Cr, tin oxide, and indium oxide may be used instead of Ag.

Note that it is preferable to use this photo masking technique because this technique makes it possible to make the linewidth of the bus electrodes narrower to around 30 µm, as compared with a conventional screen printing technique by which 100 µm is the narrowest possible linewidth. However, this is not intended to exclude a use of a known forming technique in which an electrode material is formed into a film by a vacuum deposition method, a sputtering method, or the like, and then subjected to etching processing.

Next, the paste containing lead-free dielectric glass is applied onto the formed display electrodes using the screen printing technique. Thereafter, the substrate is kept for a predetermined time period so that the glass paste is dried, which then is baked. Thus, the dielectric layer 5 is formed. Examples of lead-free dielectric glass materials include glass powders containing compounds such as $P_2O_5$—SnO, $P_2O_5$—SnO—ZnO, $Bi_2O_3$, and ZnO—$B_2O_3$—$SiO_2$.

Subsequently, the protective layer 6 made of magnesium oxide and having a thickness of about 1 µm is formed on the surface of the dielectric layer 5, by the sputtering method. Thus, the front panel is produced.

(Production of Back Panel)

A conductive material containing a metal (Ag) as its main component is applied in an equally-spaced stripe pattern onto the surface of the back substrate 1b made of soda-lime glass with a thickness of about 2.6 mm, by the screen printing method. Thus, the address electrodes 7 with a thickness of about 5 µm are formed.

Subsequently, a paste containing lead-free dielectric glass is applied thereon about 20 to 30 µm thick by the screen printing method so as to cover the formed address electrodes. The applied paste then is kept for a predetermined time period so that the glass paste is dried, which then is baked. Thus, the dielectric film 8 is formed.

Next, the barrier ribs 9 with a height of about 60 to 100 µm are formed between respective adjacent lines of address electrodes on the dielectric film 8. The barrier ribs 9 can be formed, for example, by repeating screen printing of the paste containing lead-free dielectric glass used for forming the dielectric film 8 and then baking the glass paste.

Finally, phosphor ink ($15 \times 10^{-3}$ Pa·s) containing each of a red (R) phosphor, a green (G) phosphor and a blue (B) phosphor is applied, by spraying the ink between the adjacent barrier ribs from a nozzle with a diameter of 60 µm using a pump, so that the ink is attached to the sidewalls of the barrier ribs and the exposed areas of the surface of the dielectric layer between the adjacent barrier ribs. Specifically, the phosphor ink is applied in a stripe pattern by moving the panel longitudinally of the barrier ribs 9. Thereafter, the applied ink is baked at around 500° C. for 10 minutes so that the phosphor layer 10 is formed. Thus, the back panel can be produced.

Note that the following materials can be used for RGB phosphors respectively:

Red phosphor: $Y_2O_3:Eu^{3+}$
Green phosphor: $Zn_2SiO_4:Mn^{2+}$
Blue phosphor: $BaMgAl_{10}O_{17}:Eu^{2+}$ Phosphor ink can be prepared by stirring to mix each 50 mass % of a phosphor material with a volume mean diameter of 2.0 µm, 1.0 mass % of ethyl cellulose and 49 mass % of solvent (α-Terpineol), for example, by a sand mill.

(Production of PDP)

A glass paste containing lead-free glass frit is applied onto the principal plane of at least one of the front panel and the back panel so as to cover the entire periphery of the principal plane. Examples of this lead-free glass frit include a low melting point glass powder made of a substance such as $Bi_2O_3$ or ZnO—$B_2O_3$—$SiO_2$, or a mixture of this low melting point glass powder and lead-free filler powder.

The applied paste is kept for a predetermined time period so that the paste is dried, which then is baked at around a softening point of lead-free glass contained in the glass paste, more specifically, calcined at 350° C. to 450° C. Thus, a peripheral sealing member 14 is formed. The calcination time period can be 30 minutes, for example. In the present description, what is obtained after further baking and melting the peripheral sealing member 14 is treated as the peripheral sealing wall 3 for sealing the front panel and the back panel together.

Figure 3A:
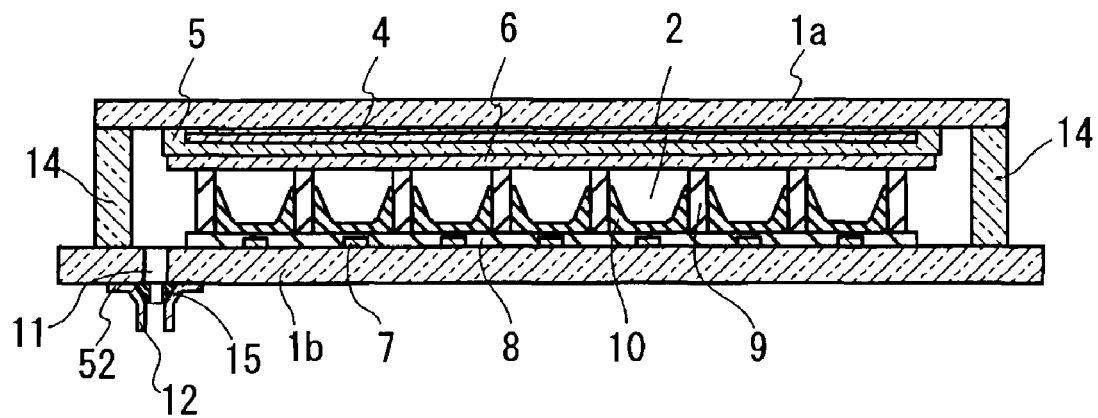
FIG. 3A is a view for illustrating an example of a method of producing the display device according to the present invention.

Next, as shown in FIG. 3A, the front panel and the back panel are disposed opposing each other so that the electrode group 4 on the front panel is orthogonal to the address electrodes 7 on the back panel. Furthermore, a vent tube typified by the tube with a flared portion 12 as shown in FIG. 4A is disposed in such a manner that the entire periphery of the hole-side end face of the tube 12 is in contact with the back panel, so that the tube 12 is communicated with the hole 11 as a vent hole formed in the back panel. In this case, a glass ring typified by the glass ring of a conical trapezoidal shape 15 as shown in FIG. 4A is bonded to the inner wall surface of the tubular portion of the vent tube.

A phosphate glass ring and a vent tube that are separated from each other may be used for mounting the vent tube on the back panel. It is preferable, however, to use a vent tube with a glass ring containing the above-mentioned phosphate glass ring therein in such a manner that the side surface of the glass ring is bonded to at least a partial area of the inner wall surface of the tubular portion of the vent tube. When the vent tube with a glass ring is used, the vent tube and the glass ring can be moved as a single unit, thereby facilitating axial alignment of the vent hole formed on the panel, the through-hole of the ring, and the vent tube.

Figure 3B:
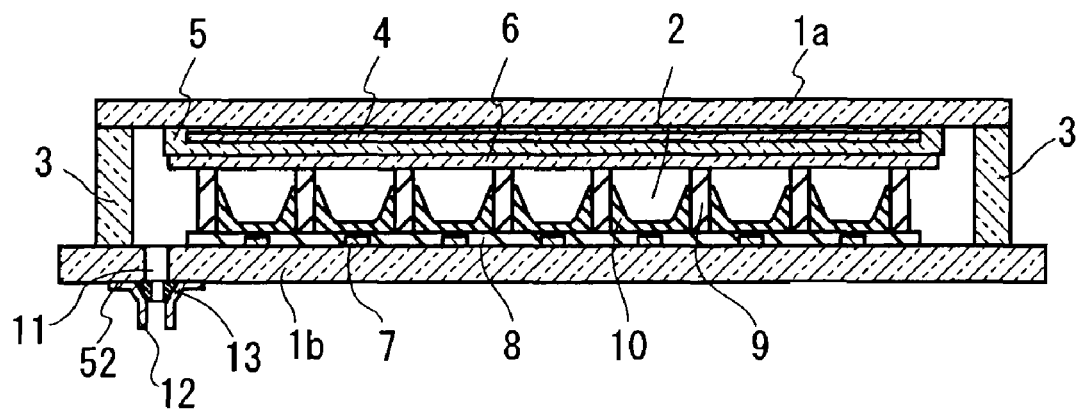
FIG. 3B is a view for illustrating the example of the method of producing the display device according to the present invention.

Subsequently, the entire panel is baked at a temperature higher by 30 to 50° C. than the softening point of the lead-free glass contained in the glass ring 15 and the peripheral sealing member 14, more specifically, at 380° C. to 500° C., for 30 minutes, so as to melt down the glass ring 15 and the peripheral sealing member 14. Thus, the glass member 13 and the peripheral sealing wall 3 that seals the panels together, as shown in FIG. 3B, are formed.

Thereafter, the discharge space is evacuated to a high vacuum (about $1.0 \times 10^{-4}$ Pa) and then is filled with discharge gas such as Ne—Xe, He—Ne—Xe, and He—Ne—Xe—Ar gas until the pressure inside the discharge space becomes a predetermined one (about 66.5 to 101 kPa here). Next, the end portion of the vent tube located on the opposite side to the hole 11, that is, the end portion of the vent tube located on the opposite side to the substrate 1b side (the narrow portion of the vent tube) is heated so that the tube wall of the end portion is welded to close the opening. Thereby, the discharge space 2 is sealed. The production of the PDP 51 thus is completed.

The vent tube with a glass ring is a vent tube containing a phosphate glass ring therein in such a manner that the side surface of the glass ring is bonded to at least a partial area of the inner wall surface of the tubular portion of the vent tube, as described above. As for the vent tube with a glass ring in the present description, a state in which a glass ring is bonded to the inner wall surface of the vent tube means a state in which a glass ring is bonded to the inner wall surface of the tubular portion of the vent tube, and thus a state in which a glass ring is bonded to the flange portion is treated as a state in which a glass ring is not bonded to the inner wall surface of the vent tube.

As for the vent tube with a glass ring, it is preferable that the bonding strength between the inner wall surface of the vent tube and the ring be increased, in such a manner, for example, that a phosphate glass ring is fitted into the tube of the vent tube and then heated to be melted to such an extent that the through-hole of the ring remains open, or, for example, that the phosphate ring is fitted into the tube of the vent tube by a known adhesive material. However, the ring simply may be fitted into the tube of the vent tube as long as the ring does not slip off the vent tube easily.

Figure 8:
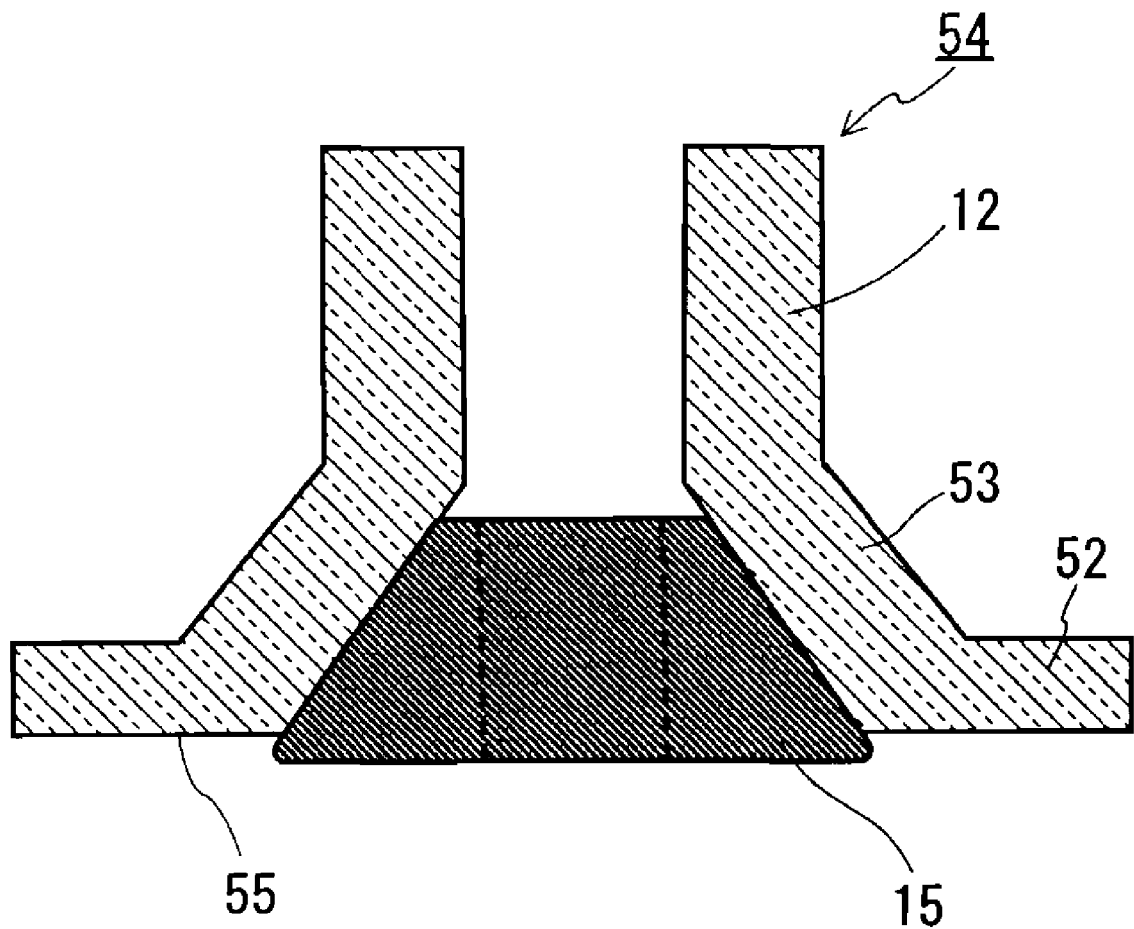
FIG. 8 is a cross-sectional view of another example of a vent tube containing a glass ring therein which is used for producing the display device according to the present invention.

In terms of firmly mounting a vent tube on a panel, it is preferable to use a vent tube with a glass tube in which the end face of a phosphate glass ring protrudes outside the end face of the vent tube. More specifically, it is preferable, as shown in FIG. 8, for example, that the phosphate glass ring 15 protrudes outside the end face 55 of the tube 12 to an extent not to prevent the entire periphery of the end face of the vent tube from being disposed in contact with the panel. During a vent tube mounting process, a glass ring and a vent tube generally are disposed in such a manner that the gravity of the glass ring is applied toward the narrow portion side of the vent tube. Therefore, when a vent tube with a glass ring with its end face protruding outside the end face of the vent tube is used, the molten glass ring can be brought into contact with the panel more firmly during the above-mentioned mounting process.

EXAMPLES

Examples of the display device of the present invention are described below.

Example 1

Example 1 is a PDP produced using the phosphate glass ring 15 having a conical trapezoidal outer shape and the tube with a flared portion 12 having an enlarged diameter portion 53 of an inner wall surface shape corresponding to the outer shape of the glass ring 15, as shown in FIG. 4A. In this PDP, the tube is mounted on the panel 1b so as to cover the hole 11 and to contain the glass member 13 therein (see FIG. 4B).

(1) Preparation of Frit-binder Mixture

As a phosphoric acid-tin oxide glass frit, 90 mass % of glass powder having a composition of 30 mol % of $P_2O_5$, 60 mol % of SnO, and 10 mol % of ZnO in terms of mol % of oxide was prepared. Next, 100 parts by mass of acetone as a solvent was added to 100 parts by mass of a mixture of this glass frit and 10 mass % of camphor as a binder, and these substances were kneaded and mixed in a ball mill for 10 minutes. Then, the mixture was maintained in the atmosphere of 30° C. or lower for 30 minutes so that the added acetone was evaporated and the mixture was dried. Thus, a frit-binder mixture was prepared.

(2) Production of Phosphate Glass Ring

The frit-binder mixture was filled into a metallic mold for shaping a ring having a conical trapezoidal outer shape. It then was shaped under pressure so that a shaped ring having a conical trapezoidal outer shape was obtained. Then, the shaped ring was heated at 360° C. to remove the binder and baked. Thus, the phosphate glass ring 15 having a conical trapezoidal outer shape was produced.

(3) Production of Vent Tube with a Glass Ring

The phosphate glass ring was fitted into the tube of the tube with a flared portion 12 and then baked at 420° C. Thus, a vent tube with a glass ring 54, as shown in FIG. 4A, was produced.

(4) Production of PDP

The PDP as shown in FIG. 1 was produced using the vent tube with a glass ring 54. This PDP was produced in accordance with the specific procedure of the above-mentioned PDP production method. The baking temperature for obtaining the peripheral sealing wall 3 and the glass member 13 was set to be 450° C. The discharge space was filled with a Xe—Ne gas as a discharge gas so that the pressure was 0.53 atmospheres (400 Torr).

Example 2

Figure 5A:
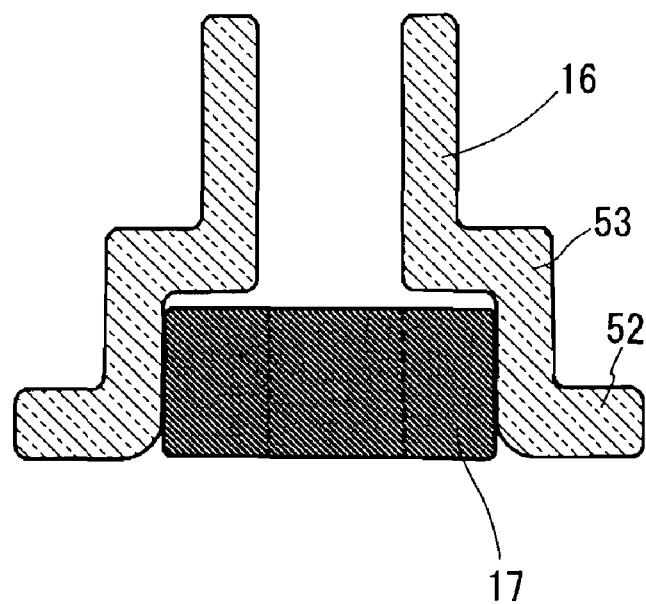
FIG. 5A is a cross-sectional view of another example of a phosphate glass ring and a vent tube containing the glass ring therein, which are used for producing the display device according to the present invention.
Figure 5B:
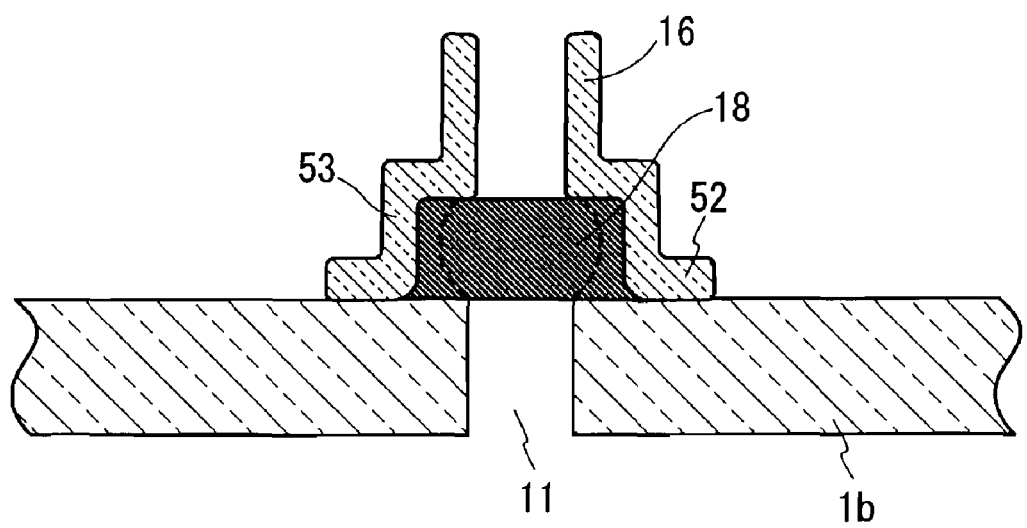
FIG. 5B is a view for illustrating another example of a state in which the tube is mounted on the panel via a phosphate glass member in the display device according to the present invention.

Example 2 is a PDP in which a tube is mounted on the panel 1b so as to cover the hole 11 and to contain a glass member 18 therein (see FIG. 5B), and was produced in the same manner as Example 1, except that a phosphate glass ring 17 having a cylindrical outer shape and a tube with a cylindrical portion 16 having the enlarged diameter portion 53 of an inner wall surface shape corresponding to the outer shape of the glass ring 17, as shown in FIG. 5A, are used. This phosphate glass ring 17 was produced using a frit-binder mixture prepared using 90 mass % of powder mixture consisting of 80 mass % of the above glass powder and 20 mass % of cordierite as a refractory lead-free filler, as well as 10 mass % of camphor as a binder.

Example 3

Figure 6A:
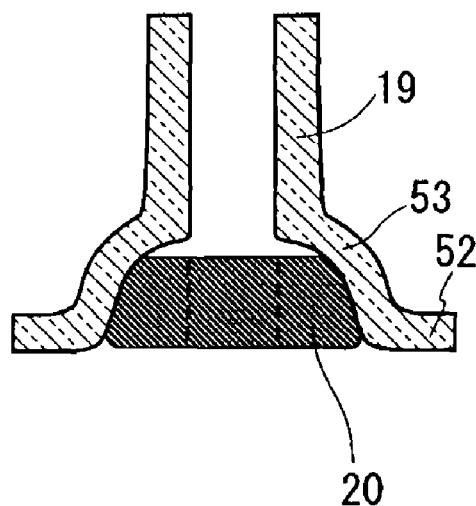
FIG. 6A is a cross-sectional view of still another example of a phosphate glass ring and a vent tube containing the glass ring therein, which are used for producing the display device according to the present invention.
Figure 6B:
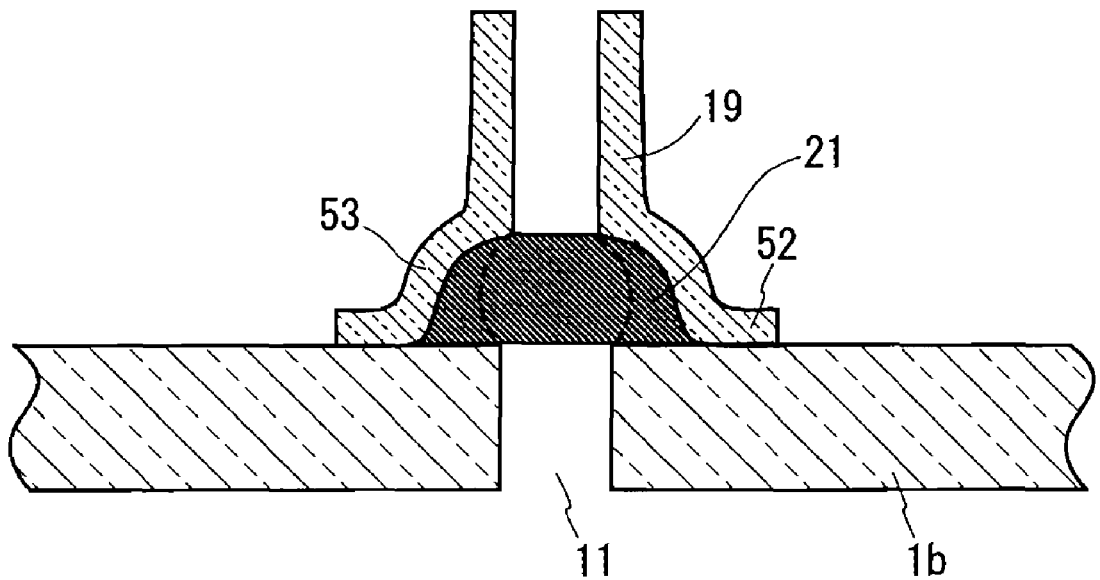
FIG. 6B is a view of still another example of a state in which the tube is mounted on the panel via a phosphate glass member in the display device according to the present invention.

Example 3 is a PDP in which a tube is mounted on the panel 1b so as to cover the hole 11 and to contain a glass member 21 therein (see FIG. 6B), and was produced in the same manner as Example 1, except that a phosphate glass ring 20 having a bell-shaped outer shape and a tube with a bell-shaped portion 19 having the enlarged diameter portion 53 of an inner wall surface shape corresponding to the outer shape of the glass ring 20, as shown in FIG. 6A, are used. This phosphate glass ring 20 was produced using a frit-binder mixture prepared using naphthalene instead of camphor as a binder as well as ethanol instead of acetone as a solvent.

Comparative Example 1

Figure 7A:
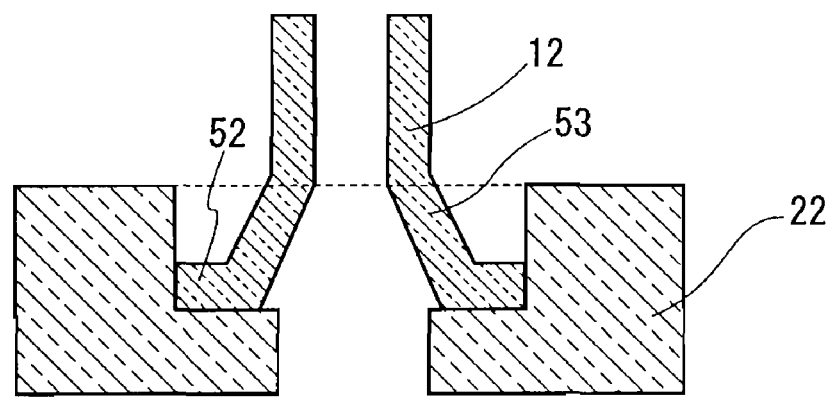
FIG. 7A is a cross-sectional view for illustrating a structure of a glass ring in Comparative Example and Conventional Example.
Figure 7B:
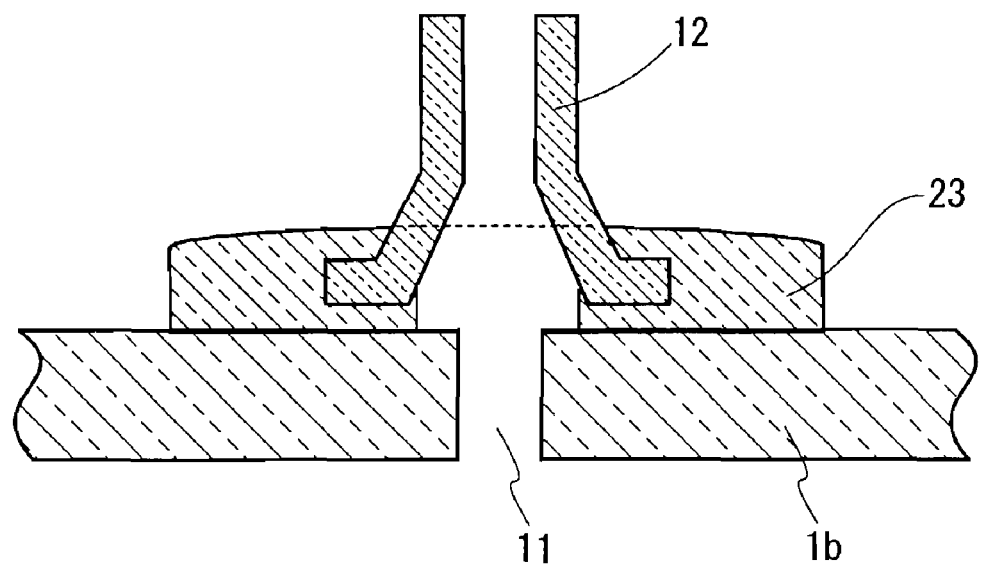
FIG. 7B is a view for illustrating a state in which the tube is mounted on the panel via a phosphate glass member in a display device in Comparative Example and Conventional Example.

Comparative Example 1 is a PDP in which a tube is mounted on the panel 1b in such a manner that a glass member 23 formed by melting a phosphate glass ring 22 is bonded to the outer wall surface (outside the tube) and the end face of the tube as well as the panel 1b (see FIG. 7B), and was produced in the same manner as Example 1, except that the phosphate glass ring 22 having a stepped portion, as a saucer for the tube with a flared portion 12, formed on the surface of the inner wall thereof, as shown in FIG. 7A, was used instead of the glass ring contained in the tube.

Conventional Example 1

Conventional Example 1 is a PDP that was produced in the same manner as Example 1, except that as a glass frit, a lead oxide glass frit, composed of a mixture of 60 mass % of lead oxide glass power having a composition of 66 mol % of PbO, 30 mol % of $B_2O_3$, and 4 mol % of $SiO_2$ in terms of mol % of oxide as well as 40 mass % of lead titanate as a refractory filler, was used instead of a phosphate glass frit.

[Evaluation of Glass Member]

Each of the glass members involved in mounting the tubes on the panel in Examples 1 to 3, Comparative Example 1 and Conventional Example 1 was heated from room temperature (25° C.) to 400° C., and gas generated by the heating was measured by the gas chromatography mass spectrometry (GC-MS) to obtain the amount of residual binder in the glass member. Table 1 shows the results thereof.

[Evaluation of PDP]

Each of the PDPs in Examples 1 to 3, Comparative Example 1 and Conventional Example 1 was subjected to the lighting test, and thereby the luminance of the panel was evaluated. The evaluation of the luminance was carried out for a freshly produced PDP and a PDP that had been exposed to a high humidity environment of 70° C. and 95% RH for 100 days (a long-term moisture resistance test), using a luminance meter (a display color analyzer). Table 1 shows the results thereof. The lighting luminance of each panel is indicated as a relative value calculated with the luminance of the freshly produced panel of Conventional Example 1 being taken as 100%.

As shown in Table 1, the PDPs in Examples 1 to 3 were lighted at the luminance values equal to the respective initial values and the initial value in Conventional Example even after the long-term moisture resistance test, which proved to be excellent in long-term moisture resistance. On the contrary, lighting of the PDP in Comparative Example 1 was not observed after the long-term moisture resistance test, which proved to be inferior in long-term moisture resistance.

Note that in Comparative Example 1, there was a gap of 85 µm between the hole-side end face of the tube and the panel. On the other hand, in Examples 1 to 3, the gap between the hole-side end face of each tube and the panel was less than 5 µm, which means that the end face of the tube and the panel was in contact with each other.

Furthermore, the PDPs in Example 1 and Comparative Example 1 were left under the environments at (1) 90° C. and 95% RH, (2) 107° C. and 95% RH, (3) 120° C. and 95% RH,

TABLE 1

| | Glass member | | | | | Lighting luminance | |
|---|---|---|---|---|---|---|---|
| | Main material | Binder used | Residual binder | Shape | Exposure to outside | Initial value | After long-term moisture resistance test |
| Example 1 | phosphorus oxide-tin oxide glass powder | camphor | none | conical trapezoidal | No | 100% | 100% |
| Example 2 | phosphorus oxide-tin oxide glass powder + lead-free filler | camphor | none | cylindrical | No | 100% | 100% |
| Example 3 | phosphorus oxide-tin oxide glass powder | naphthalene | none | bell-shaped | No | 100% | 100% |
| Comparative Example 1 | phosphorus oxide-tin oxide glass powder | camphor | none | with stepped portion | Yes | 100% | not lighted |
| Conventional Example 1 | lead oxide glass powder + refractory filler | camphor | none | with stepped portion | Yes | 100% | — |

When the amounts of an organic compound contained in the glass members involved in mounting the tube on the panel in Examples 1 to 3 were measured by the gas chromatography mass spectrometry (GC-MS), they were all less than 1 ppb, and therefore it was confirmed that these glass members essentially do not contain a binder.

When the glass rings used in Examples 1 to 3, Comparative Example 1, and Conventional Example 1 were observed visually or under a microscope, no defect such as a crack and a chip was found in all the glass rings, although these results are not shown in Table 1. When the shaped glass members obtained by shaping the frit-binder mixtures used in Examples 1 to 3, Comparative Example 1 and Conventional Example 1 into a cylindrical shape of 20 cmΦ×10 cm and then baking at 360° C. were compared with the glass rings used in Examples 1 to 3, Comparative Example 1 and Conventional Example 1 so as to evaluate the deterioration of the glass, there was no discernible deterioration in all the glass rings.

and (4) 121° C. and 100% RH, and the numbers of days during which the PDPs were lighted were counted. The results in Comparative Example 1 were: (1) 32 days, (2) 67 days, (3) 28 days, and (4) 3 days, whereas the results in Example 1 were: (1) more than 200 days, (2) more than 80 days, (3) more than 70 days, and (4) 37 days.

In Comparative Example 1, the phosphate glass member involved in mounting the tube on the panel is exposed to the outside air and the end face of the tube is not sufficiently close to the panel. Conceivably those are the reasons why the body of the glass member was eroded by the moisture in the outside air, thereby deteriorating the gas-tightness in the discharge space. On the other hand, in Examples 1 to 3, it is conceived that the close contact between the end face of the tube and the panel prevents the phosphate glass member involved in mounting the tube on the panel from coming in contact with the moisture in the outside air, thereby maintaining the gas-tightness of the discharge space for a long time.

INDUSTRIAL APPLICABILITY

According to the present invention, it is possible, in a display device such as an FED and a PDP, to reduce the amount of lead, which is a toxic chemical substance, used therein to reduce the damage to the environment, as well as to improve its long-term moisture resistance.

The invention claimed is:

1. A display device comprising:
   a panel having a hole formed therein;
   a phosphate glass member; and
   a tube mounted on the panel via the phosphate glass member so as to cover the hole,
   wherein the tube has: a tubular portion; and a flange portion connected to the tubular portion,
   the tube has, as the tubular portion: a narrow portion; and an enlarged diameter portion having a larger diameter than that of the narrow portion located closer to the panel than the narrow portion is,
   the flange portion serves as an end face of the tube located on the side of the hole,
   the phosphate glass member is bonded to at least a partial area of the inner wall surface of the enlarged diameter portion of the tubular portion and to a partial area of the panel, and
   the entire periphery of an end face of the tube located on the side of the hole is in contact with the panel.

2. The display device according to claim 1,
   wherein the phosphate glass member has, as a surface shape that contacts to at least a partial area of the inner wall surface, a shape corresponding to the outer peripheral surface of a predetermined solid of revolution,
   the outer peripheral surface is inclined at an angle of a range between more than 0 degree and less than 90 degrees with respect to a plane perpendicular to the revolution axis of the solid of revolution, and
   the outer peripheral surface is bonded to the at least a partial area of the inner wall surface.

3. The display device according to claim 2,
   wherein the outer shape of the solid of revolution is a cylindrical shape, a conical trapezoidal shape, or a bell shape.

4. The display device according to claim 1,
   wherein the phosphate glass member contains 20 mol % or more of phosphorus oxide in terms of oxide thereof.

5. The display device according to claim 4,
   wherein the phosphate glass member further contains tin oxide.

6. A vent tube with a glass ring for producing the display device according to claim 1, comprising:
   a vent tube having: a tubular portion; and a flange portion connected to the tubular portion; wherein the vent tube has, as the tubular portion: a narrow portion; and an enlarged diameter portion having a larger diameter than that of the narrow portion and located closer to the panel than the narrow portion is, and
   a phosphate glass ring bonded to at least a partial area of the inner wall surface of the enlarged diameter portion of the tubular portion,
   wherein the flange portion serves as an end face of the vent tube, and
   when the vent tube is mounted on a panel of the display device, the entire periphery of the end face of the vent tube having the flange portion comes in contact with the panel.

7. The vent tube with a glass ring according to claim 6,
   wherein an end face of the phosphate glass ring protrudes outside the end face of the vent tube.

8. The vent tube with a glass ring according to claim 6,
   wherein the phosphate glass ring has, as a surface shape that contacts to at least a partial area of the inner wall surface, a shape corresponding to the outer peripheral surface of a predetermined solid of revolution,
   the outer peripheral surface is inclined at an angle of a range between more than 0 degree and less than 90 degrees with respect to a plane perpendicular to the revolution axis of the solid of revolution, and
   the outer peripheral surface is bonded to the at least a partial area of the inner wall surface.

9. The vent tube with a glass ring according to claim 6,
   wherein the phosphate glass ring has, as a surface shape that contacts to at least a partial area of the inner wall surface, a shape corresponding to the outer peripheral surface of a predetermined solid of revolution, and the outer shape of the solid of revolution is a cylindrical shape, a conical trapezoidal shape, or a bell shape.

10. The vent tube with a glass ring according to claim 6,
    wherein the phosphate glass ring contains 20 mol % or more of phosphorus oxide in terms of oxide thereof.

11. The vent tube with a glass ring according to claim 10,
    wherein the phosphate glass ring further contains tin oxide.

12. The vent tube with a glass ring according to claim 6,
    wherein the phosphate glass ring is not bonded to the flange portion.

13. The vent tube with a glass ring according to claim 6,
    wherein the phosphate glass ring is a sintered body made of a phosphate glass fit.

14. A method of producing the phosphate glass ring according to claim 1,
    wherein the phosphate glass ring is a sintered body made of a phosphate glass frit,
    the phosphate glass ring has, as a shape to be contacted with at least a partial area of the inner wall surface of a tube to be mounted on a panel, a face corresponding to the outer peripheral surface of a predetermined solid of revolution, and has, a shape to be contacted with a partial area of the panel, an end face with a through-hole formed therein,
    the outer peripheral surface is inclined at an angle of a range between more than 0 degree and less than 90 degrees with respect to a plane perpendicular to the revolution axis of the solid revolution, and
    the phosphate glass ring essentially does not contain a binder,
    wherein, the method comprising the steps of:
    shaping a frit-binder mixture containing a phosphate glass fit and a binder so as to obtain a shaped ring having a face corresponding to the outer peripheral surface of a predetermined solid of revolution as well as an end face with a through-hole formed therein, the binder being solid in the atmosphere of 25° C., having a boiling point of 400° C. or lower, and being sublimable in the atmosphere of 101325 Pa; and
    heating the shaped ring so as to remove the binder.

15. The method of producing the phosphate glass ring according to claim 14,
wherein the binder is at least one selected from the group consisting of camphor, naphthalene, and anthracene.

16. The method of producing the phosphate glass ring according to claim 14,
wherein the content of the binder relative to that of the phosphate glass frit is in a range from 1 mass % to 20 mass %, inclusive, in the fit-binder mixture.

17. The method of producing the phosphate glass ring according to claim 14,
wherein the heating is carried out at a temperature of a range from 200° C. to 450° C., inclusive, to remove the binder.

18. The display device according to claim 1,
wherein the phosphate glass member is not bonded to the flange portion nor the panel therebetween.

* * * * *

UNITED STATES PATENT AND TRADEMARK OFFICE
CERTIFICATE OF CORRECTION

PATENT NO. : 7,737,619 B2  
APPLICATION NO. : 12/495257  
DATED : June 15, 2010  
INVENTOR(S) : Kai et al.

It is certified that error appears in the above-identified patent and that said Letters Patent is hereby corrected as shown below:

Column 18, line 36, "fit" should be --frit--.
Column 18, line 56, "fit" should be --frit--.
Column 19, line 9, "fit-binder" should be --frit binder--.

Signed and Sealed this

Thirtieth Day of November, 2010

David J. Kappos
*Director of the United States Patent and Trademark Office*